United States Patent
Sailer et al.

(10) Patent No.: US 8,365,019 B2
(45) Date of Patent: Jan. 29, 2013

(54) SYSTEM AND METHOD FOR INCIDENT MANAGEMENT ENHANCED WITH PROBLEM CLASSIFICATION FOR TECHNICAL SUPPORT SERVICES

(75) Inventors: Anca Sailer, Scarsdale, NY (US); Hidayatullah Habeebullah Shaikh, Mohegan Lake, NY (US); Yang Song, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/485,655

(22) Filed: Jun. 16, 2009

(65) Prior Publication Data

US 2010/0318846 A1 Dec. 16, 2010

(51) Int. Cl.
*G06F 11/00* (2006.01)

(52) U.S. Cl. ........... 714/26; 714/25; 714/37; 714/39

(58) Field of Classification Search ........... 714/26, 714/25, 37, 39
See application file for complete search history.

(56) References Cited

U.S. PATENT DOCUMENTS

| | | | |
|---|---|---|---|
| 5,682,523 A | 10/1997 | Chen et al. | |
| 5,835,901 A * | 11/1998 | Duvoisin et al. | 706/19 |
| 5,897,630 A | 4/1999 | Schneider Huddleston Virta et al. | |
| 6,249,755 B1 * | 6/2001 | Yemini et al. | 702/183 |
| 6,353,902 B1 * | 3/2002 | Kulatunge et al. | 714/712 |
| 6,532,552 B1 | 3/2003 | Benignus et al. | |
| 6,636,981 B1 | 10/2003 | Barnett et al. | |
| 6,671,723 B2 | 12/2003 | Nguyen et al. | |
| 6,725,405 B2 | 4/2004 | Batten et al. | |
| 6,804,714 B1 | 10/2004 | Tummalapalli | |
| 7,039,644 B2 | 5/2006 | Hind et al. | |
| 7,096,459 B2 | 8/2006 | Keller et al. | |
| 7,131,037 B1 * | 10/2006 | LeFaive et al. | 714/46 |
| 7,167,998 B2 | 1/2007 | Brodie et al. | |
| 7,171,337 B2 * | 1/2007 | Yuan et al. | 702/185 |
| 7,184,935 B1 | 2/2007 | Cohen et al. | |
| 7,194,445 B2 | 3/2007 | Chan et al. | |
| 7,213,174 B2 * | 5/2007 | Dahlquist et al. | 714/37 |
| 7,360,120 B2 | 4/2008 | De Pauw et al. | |
| 7,418,733 B2 * | 8/2008 | Connary et al. | 726/25 |
| 7,489,639 B2 * | 2/2009 | Breitgand et al. | 370/241 |
| 7,500,142 B1 * | 3/2009 | Cowart et al. | 714/25 |
| 7,756,968 B1 * | 7/2010 | Frey et al. | 709/224 |
| 7,844,108 B2 * | 11/2010 | Sabe et al. | 382/159 |
| 7,877,644 B2 * | 1/2011 | Stenzel | 719/327 |

(Continued)

OTHER PUBLICATIONS

IBM Corporation, Network Solutions—A Company Insight Profile, http://www-07.ibm.com/in/netsol/products_services.html., 1994.

(Continued)

*Primary Examiner* — Loan L.T. Truong
(74) *Attorney, Agent, or Firm* — Tutunjian & Bitetto, P.C.; Louis Percello

(57) ABSTRACT

A system and method of problem determination and resolution utilizes enhanced problem classification, and effectively categorizes any problem a user experiences by leveraging all available data to recognize the specific problem. Historical problem data is labeled with the cause of that problem and is analyzed to learn problem patterns. The historical problem data is classified into a predefined hierarchical structure of taxonomies by using an incremental online learning algorithm. The hierarchical structure and learned patterns are utilized to recognize problems and generate the root cause of the problem when given a new set of monitoring data and log data.

23 Claims, 6 Drawing Sheets

U.S. PATENT DOCUMENTS

| | | | |
|---|---|---|---|
| 8,180,723 B2* | 5/2012 | Bethke et al. | 706/49 |
| 2001/0044854 A1* | 11/2001 | Frary | 709/310 |
| 2003/0149919 A1* | 8/2003 | Greenwald et al. | 714/43 |
| 2004/0078683 A1* | 4/2004 | Buia et al. | 714/37 |
| 2005/0015217 A1* | 1/2005 | Weidl et al. | 702/185 |
| 2005/0149947 A1* | 7/2005 | Callender | 719/321 |
| 2005/0172306 A1* | 8/2005 | Agarwal et al. | 719/328 |
| 2005/0246590 A1* | 11/2005 | Lancaster | 714/47 |
| 2006/0048010 A1* | 3/2006 | Tai et al. | 714/37 |
| 2006/0085689 A1* | 4/2006 | Bjorsne | 714/39 |
| 2007/0038705 A1* | 2/2007 | Chickering et al. | 709/206 |
| 2007/0112746 A1* | 5/2007 | Todhunter | 707/4 |
| 2008/0097940 A1* | 4/2008 | Ben-Hur et al. | 706/12 |
| 2008/0126858 A1* | 5/2008 | Barras | 714/25 |
| 2008/0215513 A1* | 9/2008 | Weston et al. | 706/13 |
| 2009/0070463 A1* | 3/2009 | Cowart et al. | 709/224 |
| 2009/0158096 A1* | 6/2009 | Ali et al. | 714/43 |
| 2009/0313367 A1* | 12/2009 | Alon et al. | 709/223 |
| 2009/0327195 A1* | 12/2009 | Iscen | 706/47 |
| 2010/0027431 A1* | 2/2010 | Morrison et al. | 370/252 |
| 2010/0100774 A1* | 4/2010 | Ding et al. | 714/45 |
| 2010/0287416 A1* | 11/2010 | Shacham et al. | 714/39 |

OTHER PUBLICATIONS

IBM Corporation, Tivoli Monitoring, http://www.ibm.com/software/tivoli/products/monitor., 1994.

IBM Coporation, IBM Systems Director, http://www-03.ibm.com/systems/management/director/, 1994.

Agarwal, M. et al., Problem Determination in Enterprise Middleware Systems Using Change Point Correlation of Time Series Data, In Proceedings of the IFIP/IEEE Network Operations and Management Symposium, Apr. 2006, 12 pages.

IBM Corporation, IBM Support Assistant, http://www-306.ibm.com/software/support/isa/, 1994.

* cited by examiner

1: Input training data $\{x_i, y_i\}_1^N$, $x_i \in \mathbb{R}^d$ $d$-dimensional feature vector, $y_i = \{y_1,...,y_M\} \in \{0,1\}^M$ multilabel, where $N$: number of instances, $M$: number of labels (nodes)
2: Initialize local classifiers for all $M$ nodes $\{f_1(x),...,f_M(x)\}$
3: for each training data $x_i$ ($i = 1...N$)
4:   for each label $m$ ($m = 1...M$)
5:     classify $x_i$ using $f_m(x_i)$
6:     if $x_i$ is misclassified then update $f_m(x_i)$
7:   end for
8: end for
9: Output $M$ classifiers $\{f_1(x),...,f_M(x)\}$

FIG. 5

1: Initialize the parameters for each $f_m(x)$
   $w^m = \{0,...,0\}^d, w_0^m = -1$, augment $\tilde{w}^m = \{w_0^m, w^m\}$
2: for each training data $x_i$ $(i = 1...N)$
3:    augment $\tilde{x}_i = \{1, x_i\}$
4:    for each label $m$ $(m = 1...M)$
5:      classify $\tilde{x}_i$ using $f_m(\tilde{x}_i) = \tilde{w}^m \tilde{x}_i$
6:      if $x_i$ is misclassified
7:        $\tilde{w}^m = \tilde{w}^m + \frac{\delta + \epsilon}{\|\tilde{x}_i\|^2} \tilde{x}_i$, where
8:        $\delta = -\tilde{w}^m \tilde{x}_i$ and $\epsilon$ is a small positive number
9:      end if
10:   end for
11: end for

FIG. 6

SYSTEM AND METHOD FOR INCIDENT MANAGEMENT ENHANCED WITH PROBLEM CLASSIFICATION FOR TECHNICAL SUPPORT SERVICES

BACKGROUND

1. Technical Field

The present invention relates to incident management for technical support services, more specifically, to an enhanced problem determination and resolution technique.

2. Description of the Related Art

Problem determination and resolution (PDR) is the process of detecting anomalies in a monitored system, locating the problems responsible for the issue, determining the root cause of the problem and fixing the cause of the problem. Thus, identifying the type of problem and the cause of the problem are important aspects in searching for the relevant fix.

However, identifying the root cause of the problem is not always a simple task. For example, a user may experience a front-end issue and search for fixes related to front-end problems while, in reality, the issue is being caused by a back-end problem. Thus, the problem that a user experiences may be only the effect of an underlying issue within the IT environment and the fixes found are not addressing the root cause. These situations are becoming more common, especially when dealing with software problems in multi-tier IT environment with complex system dependencies. An example of such a multi-tier environment is an e-business system which is supported by an infrastructure consisting of the following subsystems connected by local and wide area networks; web based presentation services, access services, application business logic, messaging services, database services and storage subsystems.

Although there are existing solutions that try to provide problem determination, these solutions are limited in their application. For example, some solutions in the prior art are problem specific and, as such, lack the potential of being applied to wide array of issues. In other words, these solutions can only determine one specific type of problem (e.g., only network problems, only hardware problems, only storage area network [SAN] problems, only database problems, only peripheral component interconnect redundant array of inexpensive disks [PCI RAID] problems or only web problems) and are not effective in searching for any other type of problem.

In addition, some prior art methodologies use only one type of the available information (e.g., only logs or only performance metrics). Thus, these solutions may be ignoring information that may be relevant to the problem at hand. Furthermore, some prior art solutions provide a particular approach to the PDR technology that is applicable only in specific scenarios (e.g.: dependencies, probes, data and tools federation, probes in code/program classes) and not applicable in other scenarios.

Moreover, existing problem classification solutions for problem determination usually involve human testers for annotation judgment, namely a semi-supervised approach, which labor intensive. Recent approaches that try to automate the classification process either define a set of rules, preset a set of threshold for monitoring, lean from preset attribute vectors or statistically analyze historical data. All of the above approaches use a flat structure of the taxonomy when it comes to classify the problem instance. The flat structure has scalability limitations when the problem space becomes large, which is the case of complex modern IT environments.

SUMMARY

There is a need for a versatile PDR system which is effective in determining and resolving the true root cause of any problem that may arise in an IT environment. Moreover, the cost of PDR for system managers may represent more than half of their operational costs. A faster, more versatile and more effective PDR solution can contribute to a substantial reduction in system administration costs.

Embodiments of the present invention include a system and method of problem determination and resolution which utilize enhanced problem classification. An incident management system employing the present principles may include a monitor and data collector which monitors the IT environment, collects all available data about the entire environment and, when a problem in the environment occurs, sends the collected problem data to a historic problem data storage device and to a problem data pattern classifier. In a further embodiment, the monitor and data collector may compare collected data to historic problem data and/or patterns to determine if there are problems in the IT environment.

The incident management system may further include a storage device, which stores historic problem data labeled with the root cause of the problem associated with that data, and a problem data pattern classifier, which classifies current problem data into a predefined hierarchical structure and automatically generates the root cause of the current problem based on the historic problem data stored in the storage device. The hierarchical structure may include one or more trees, each comprising a root node and one or more leaf nodes. Further, a linear classifier may be trained for each node in the hierarchy and the root cause of new problems may be generated by traversing the hierarchy in a top-down fashion and utilizing the trained linear classifiers at each node. The problem data pattern classifier may further learn problem patterns from the historic problem data and root causes stored in the storage device and use these patterns to generate the root cause of new problems. In one embodiment, the learned patterns are stored in a storage device. In a further embodiment, the patterns are learned incrementally when new historical problem data is available.

Further embodiments of an incident management system employing the present principles may include a problem determination module in communication with a user node in an IT environment. The problem determination module may include the capabilities to communicate problem notifications to the monitor and data collector, receive problem data from the monitor and data collector, receive the automatically generated root cause of the problem from the problem data pattern classifier, present the problem data and generated root cause to the user or technical support personnel, allow the user to confirm or edit the actual root cause of the problem and communicate the cause of the problem to the historic problem data storage as the label of the data associated with that problem.

A method in accordance with the present principles may include learning patterns of problem causes by classifying problem data into a predefined hierarchical structure, collecting all available data from an IT environment when a problem occurs, generating the root cause of the problem using the collected data and the learned problem patterns, utilizing the generated root cause and the collected data to solve the problem and storing the collected data in a storage device and labeling the data with the root cause of the problem associated with that data.

In a further embodiment, the hierarchical structure may comprise one or more nodes and a linear classifier is trained for each node and the root cause may be generated by traversing the hierarchy in a top-down fashion and utilizing the trained linear classifiers at each node. In yet a further embodiment, the step of learning patterns may be performed incrementally when new historical problem data is available.

The method may further include presenting the generated root cause and the collected data to a user via an input/output interface, wherein the user utilizes the root cause and the collected data to solve the problem. In this embodiment, the method may further include receiving from the user a confirmation that the generated root cause is the actual root cause or a new root cause that is the actual root cause, and labeling the collected data for that problem in the storage device with the actual root cause confirmed or entered by the user.

Methods in accordance with the present invention may also include storing the learned problem patterns in memory or a storage device and determining if a problem has occurred in the IT environment by collecting monitoring data from the IT environment and comparing the monitored data with the stored problem patterns.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a pseudocode representation of one process that may be employed to train classifiers of the present invention.

FIG. 6 is a pseudocode representation of another process that may be employed to train classifiers of the present invention.

DETAILED DESCRIPTION OF PREFERRED EMBODIMENTS

Figure 1:
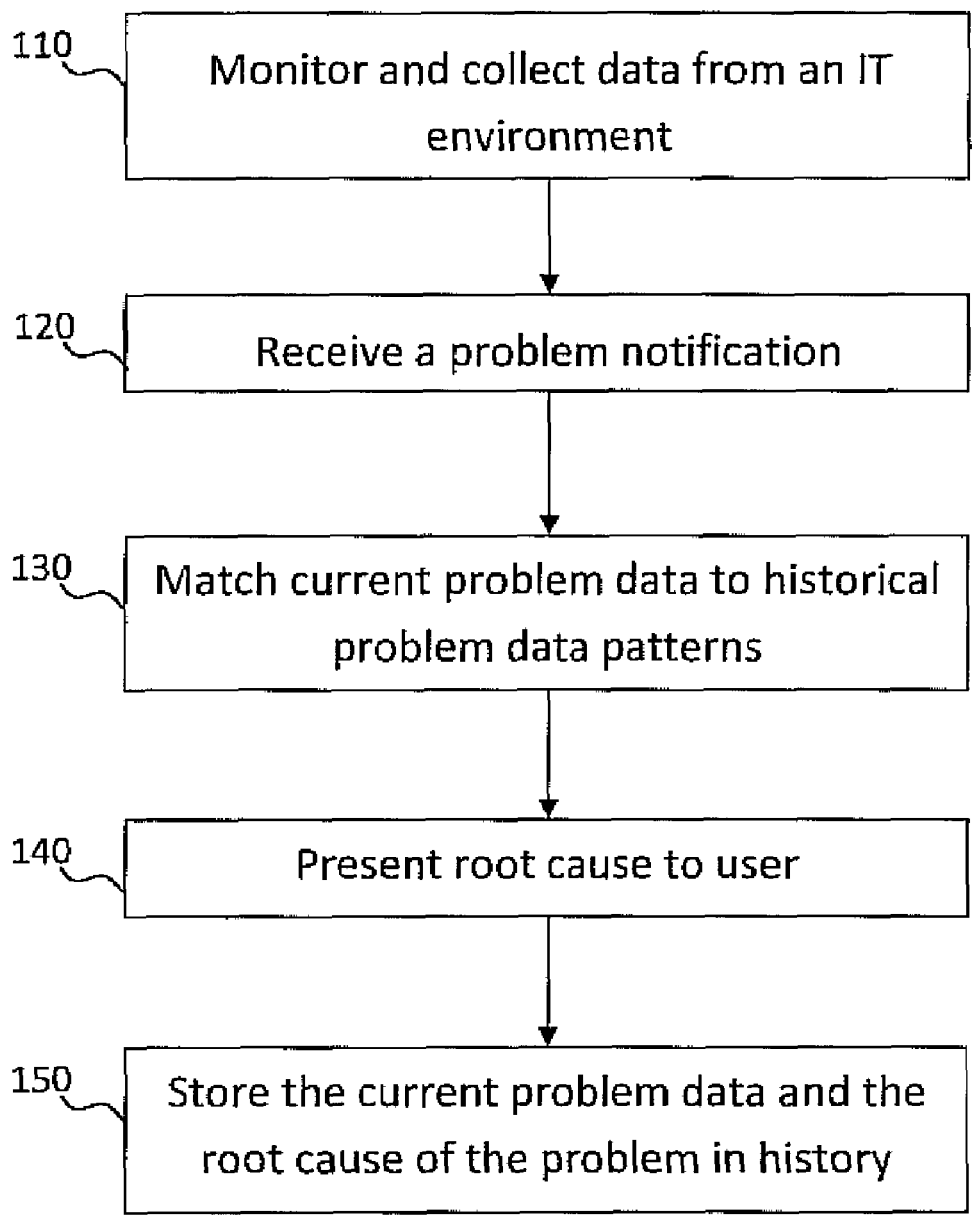
FIG. 1 is a block/flow diagram of a system/method depicting an overview of the present principles.

Embodiments of the present invention generate information, such as monitoring data, logs data, and/or problem tickets, labeled with the true root cause of the problem that occurred when the data or the ticket was generated. In accordance with the present principles, historical labeled data is analyzed to learn the patterns specific for the existing problem taxonomy. Embodiments of the present invention utilize these learned patterns to recognize problems when given a new set of monitoring data and/or log data.

In accordance with the present principles, embodiments of the present invention formulate the problem into a hierarchical structure and use a top-down incremental online learning algorithm to efficiently address this issue. The approach in the present invention determines the cause of the problem on a top-down fashion, e.g., application/product>category>the specific problem. Thus, the present principles demonstrate the numerous advantages over the prior art, which include: (1) by transforming the flat structure of the problem space into a hierarchy (see FIG. 4) which is predefined according to an existing taxonomy (e.g., the IBM Support Assistant ISA™), the complexity of the pattern search is reduced. (2) The present principles utilize an incremental learning algorithm which is capable of adjusting its internal local classifier parameters whenever a new training instance is available. Comparing to the traditional batch learning algorithms, this on-line learning framework can significantly decrease the computational complexity of the training process by learning from new instances on an incremental fashion. At the same time this reduces the amount of memory required to store the training instances. (3) For efficiency, embodiments of the present invention may train a linear classifier at each node in the hierarchy. Since linear classifiers usually have simpler decision boundaries, they exhibit better generalization toward large data sets. Meanwhile, linear classifiers require less internal parameters to learn, which potentially avoids the problem of over-fitting caused by large number of model parameters.

Thus, embodiments of the present invention effectively categorize any problem a user experiences by leveraging all available data to recognize the specific problem. Some examples of the data which a system employing the present principles may leverage include (but are not limited to) performance data, resources consumption data, logs data. In this manner, the present principles enable the user to identify the root cause so that the fix is searched based on the cause rather than on its propagated effects. This results in operational cost savings. Further, by leveraging a larger set of data, embodiments of the present invention increase the accuracy of the problem identification.

If the problem results in a service request submission to technical support, the technical support problem routing system can benefit from this initial problem classification instead of symptom based classification. This reduces the risk of having to re-route the request when the symptom is discovered only to be a remote effect of a cause located in a completely different resource. As can be appreciated, having to re-route the request results in both a waste of the technical support resources and a longer response time of support to fix the problem.

Embodiments of the present invention can take the form of an entirely hardware embodiment, an entirely software embodiment or an embodiment including both hardware and software elements. In a preferred embodiment, the present invention is implemented in a combination of hardware and software, which may include but is not limited to one or more appropriately programmed general-purpose digital computers having a processor and memory and input/output interfaces, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference will now be made to the drawings in which like numerals represent the same or similar elements and initially to FIG. 1, which is a block/flow diagram demonstrating an overview of one embodiment of the present invention. The system/method begins in block 110 by monitoring and collecting data from an IT environment. In block 120, the system/method receives a problem notification. In block 130, the system/method matches the current monitored data to historical data patterns to determine the root cause of the problem. The system/method then presents this root cause to the user in block 140. The system/method then stores the current monitored data and the root cause of the problem in the problem history at block 150, so this problem data can be utilized to determine future similar problems.

Figure 2:
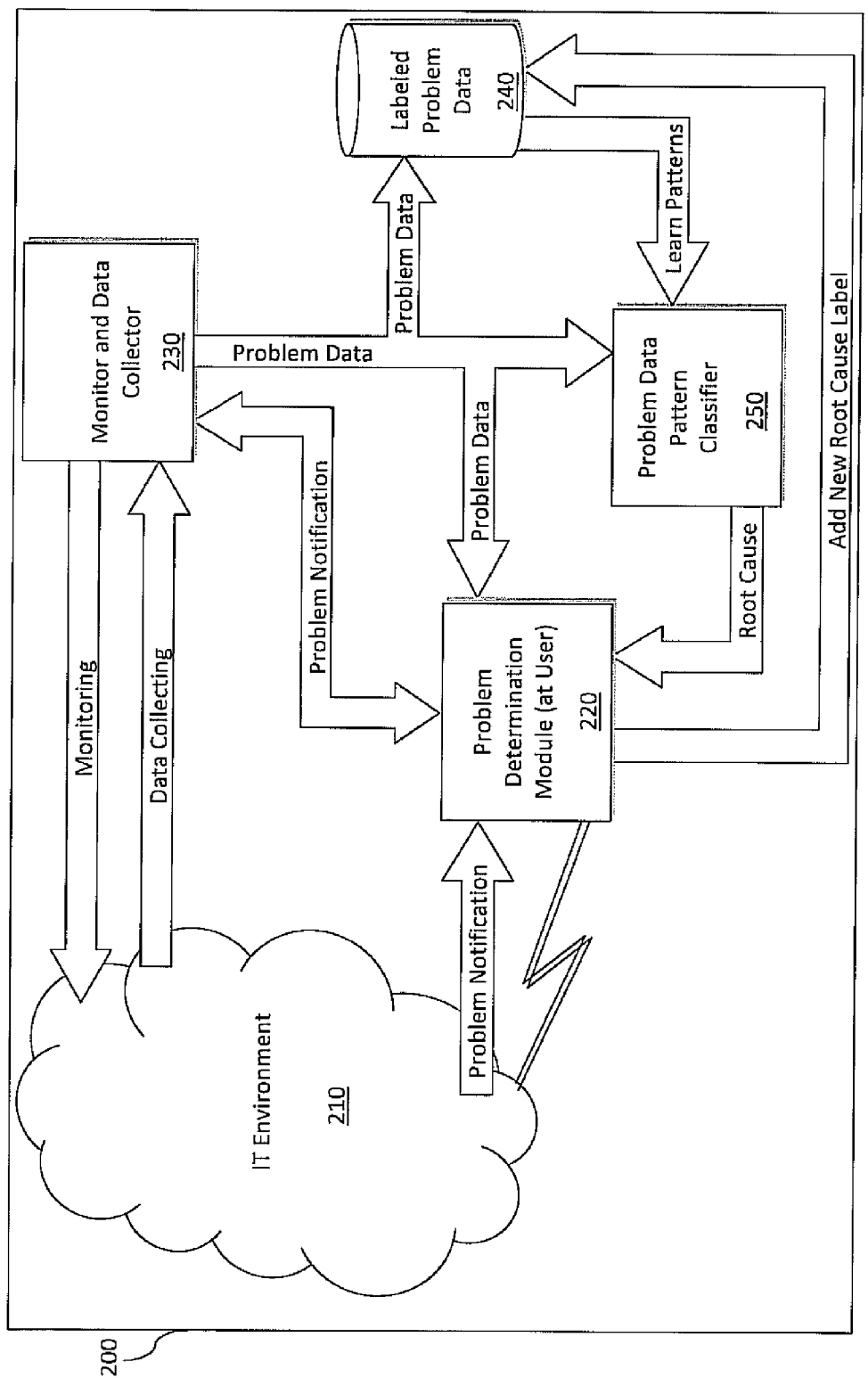
FIG. 2 depicts an exemplary incident management system in which the present principles may be advantageously employed.

FIG. 2 represents an exemplary incident management system in accordance with the present principles. The incident management system 200 includes an IT environment 210 which comprises, among other things, a plurality of users. At least one of the user workstations may include a Problem Determination Module (PDM) 220. The PDM 220 includes processes and tools through which the customer's incident is solved. It may take the form of a self-assist tour (e.g., ISA) or of a cycle through the technical support process. In a further embodiment, the PDM 220 may include the capability to send and receive problem notifications to and from other components in the incident management system (e.g., the Monitor and Data Collector 230 and the IT environment 210). The PDM 220 may also include the ability for a user, after solving the problem, to confirm that the generated root cause was the problem or to enter the actual root cause of problem, if different from the generated cause.

The IT environment 210 is monitored by the Monitor and Data Collector (MDC) 230. The MDC 230 may include numerous monitoring tools, such as monitoring servers, agents, probes, data warehouses. Through these tools, the MDC 230 monitors the many parts of the IT environment 210 and collects all available data about the environment 210, such as, but not limited to, performance data, resource consumption data and logs data. A few examples of many monitoring tools which the MDC 230 may employ include NetSol™, ITM™ and Director™.

In accordance with the present principles, the MDC 230 may also compare any newly collected data to stored problem data sets and/or stored problem patterns to determine if there is a problem in the IT environment 210. When a problem in the IT environment 210 occurs, the MDC 230 sends the current monitoring data to at least one of the PDM 220, the Labeled Problem Data Storage (LPDS) 240 and the Problem Data Pattern Classifier (PDPC) 250. In one embodiment, all three of the above modules receive the monitoring data.

The LPDS 240 is a storage device that stores the monitoring data it receives from the MDC 230 at the time a problem occurs in the IT environment 210. The LPDS 240 also stores one or more corresponding labels with each set of stored problem data. Preferably, the label represents the cause of the problem which generated the corresponding data. As can be appreciated, the LPDS 240 may take the form of a database, a file, a collection of files or any other form of data storage.

The PDPC 250 classifies the labeled data stored in the LPDS 240 into patterns. The PDPC 250 may store the learned patterns in a database, a file, a collection of files or any other form of data storage. In a further embodiment, the stored data patterns are made accessible to the MDC 230 for comparison with the collected monitor data. The PDPC 250 may employ any number of classification methods to learn the data patterns. In response to a problem in the IT environment 210, the PDPC 250 compares the current monitored data to the stored problem patterns to automatically generate a root cause label for the current monitored data. In a further embodiment, the PDPC 250 sends the generated root cause to the PDM 220, which presents the generated root cause to a user to aid the solving of the current problem in the IT environment 210.

Figure 3:
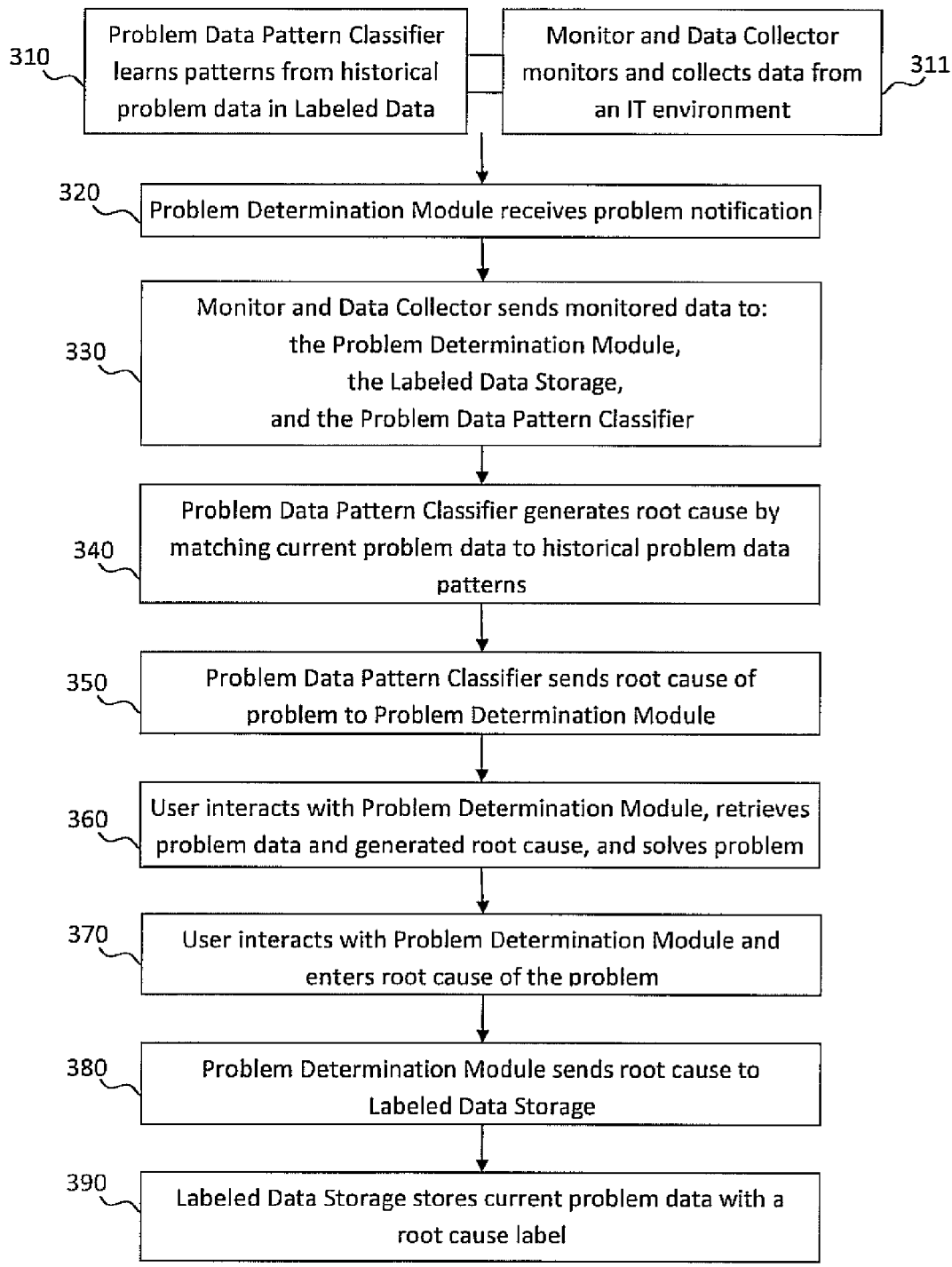
FIG. 3 is a block/flow diagram which displays a system/method for utilizing the exemplary incident management system depicted in FIG. 1.

FIG. 3 is a block/flow diagram detailing the operation of the exemplary incident management system displayed in FIG. 2 and begins in blocks 310 and 311. The specific order that these blocks are performed is unimportant (i.e., block 310 may be performed before block 311 or block 311 may be performed before block 310). In one embodiment, the connected blocks may be performed simultaneously. In block 310, the PDPC 250 learns patterns from the historical problem data in the LPDS 240 and stores the learned patterns in memory/storage. At block 311 the MDC monitors and collects data from the IT environment 210 on an ongoing basis. In a further embodiment, the MDC 230 may actively compare newly collected monitoring data to stored historic problem data and/or stored problem patterns to recognize if a problem has occurred or is about to occur in the IT environment.

At block 320, the PDM 220 receives a notification or alert that an error or problem has occurred. This problem notification may be sent from the user on which the PDM 220 resides or any other element in the IT environment 210. In another embodiment, the MDC 230 may recognize a problem, derive the problem notification, and send the notification to the PDM 220. However, in either embodiment, if the problem notification was not sent from the MDC 230, the PDM 220 will notify the MDC 230 of the alert.

The system/method then proceeds to block 330 where, in response to the problem, the MDC 230 sends all monitored and collected data associated with the time the problem occurred to the PDM 220, the LPDS 240 and the PDPC 250. Upon receiving the current problem data, at block 340 the PDPC 250 automatically generates the root cause of the problem by matching the current problem data to the stored, historical data patterns and root cause labels. The PDPC 250 then sends the generated root cause to the PDM 220 in block 350. At block 360, the user may then interact with the PDM 220 to retrieve the monitored problem data and the generated root cause. The user may use this information to solve the problem.

Once the problem has been solved, the user will interact with the PDM in block 370 to either verify that the generated root cause was, in fact, the cause of the problem or to enter a new root cause if the generated root cause was not the true cause. In block 380, the PDM 220 sends the root cause to the LPDS 240. Then, at block 390, the LPDS 240 stores the problem data sent from the MDC 230 and labels that data with the root cause set from the PDM 220. The system/method then returns to blocks 310 and 311 where the PDPC 250 learns patterns from the historic problem data, which now includes the labeled problem data from the recently solved problem, and where the MDC 230 monitors the IT environment 210 for new problems.

The learning of problem patterns by the PDPC 250 will now be discussed in more detail. Embodiments of the present invention may utilize a hierarchical classification framework which classifies the problems from the top level of the taxonomy to the leaves, by training a local classifier at each node. This hierarchical approach allows problem categorization in an automatic fashion.

Figure 4:
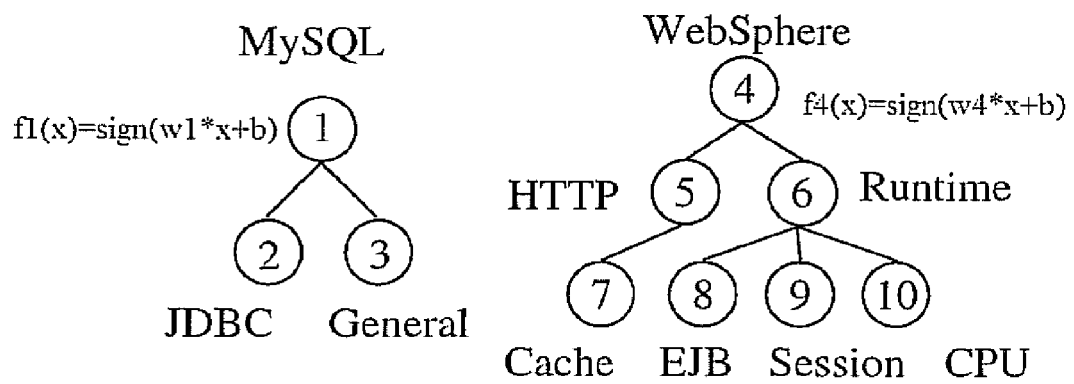
FIG. 4 is an example of a problem determination taxonomy in accordance with the present principles.

In one embodiment, each problem will be annotated with a set of labels that include the name of the application/product as well as the specific cause(s) of the problem. This set of inter-related labels can be well-represented using a hierarchical forest structure as shown in FIG. 4, where each tree in the forest specifies possible causes of a specific application/product. The name of the application/product may be assigned to the root of the tree whose level-structure may be decided by the complexity of the application/product. Regardless of the tree structure of an application/product, however, the path of the labels always starts at a root node and ends at a leaf node. For each individual problem there is one and only one such path in the entire forest. Note that whenever a certain node is included in the label set, all the nodes on the path to the root node must also be included.

To automate the problem classification for the problem determination process, a set of labeled training data is needed for the classifiers to learn the patterns of the problem taxonomy. This labeled training data may be supplied automatically by the LPDS 240 or manually by a user. In accordance with the present principles, each problem instance contains a set of labels which is referred to as a multilabel: e.g., {MySQL, General}, {WebSphere, Runtime, CPU}. The presence of a multilabel indicates whether a problem instance has been labeled by all nodes in the tree structure relevant to the problem. The multilabel may be represented in any number of ways. A simple representation of multilabel is a binary coding schema, where 1 indicates the presence of the problem instance at a node, and 0 indicates the absence of the problem instance at a node. In the example shown in FIG. 4, where a total of M=10 labels exist, the problem instance (in grey nodes) has two labels: label 1 and 3. Thus, the associated multilabel can be represented as {1,0,1,0,0,0,0,0,0,0}.

For training the classifiers, each problem instance may be transformed into a feature vector x, where the features may correspond to the information collect by die MDC 230, such as words that appear in error logs, numerical thresholds monitored, and so on. Given a set of problem instances $\{x_i\}$ with their associated multilabels $\{y_i\}$, embodiments train M classifiers for the taxonomy, where each node in the taxonomy has a local classifier. The process is demonstrated in FIG. 5 in pseudocode form, where each $x_i$ is a d-dimensional feature vector and $y_i$ is an M-dimensional multilabel vector. Each problem instance $x_i$ is passed to all M nodes for classification. If the predicted label is different from the actual label at a specific node m, its associated decision functions are then updated using the feature vector $x_i$.

In one embodiment of the present principles, a linear classifier may be employed at each node for pattern classification.

Usually, a linear classifier can be represented as $f(x)=w^T x+w_0$, where w is called weight vector and has the same dimensionality as the feature vector x. $w_0$ indicates the bias or offset of the classifier. w and $w_0$ are the internal parameters of the classifier which are learned during the training phase. In one embodiment, utilizing binary classification each label $y_m$ is either 0 (negative) or 1 (positive) and an input vector $x_i$ is classified to the positive class if $f(x) \geqq 0$ and to the negative class otherwise.

Embodiments of the present invention may employ numerous types of linear classifiers, including discriminant classifiers like Fisher's linear discriminant, and generative classifiers like naïve Bayes. In one embodiment the Perceptron algorithm is use because this algorithm can incrementally update the parameters w and $w_0$ whenever a new training instance becomes available. Specifically, the Perceptron updates at each node m the parameters w and $w_0$ when the instance $x_i$ is misclassified. Thus, in the case the true label of $x_i$ is positive (1) but predicted to be negative (0), the parameters are updated by adding $x_i$: $w=w+x_i$; in the case the true label of $x_i$ is negative (0) but predicted to be positive (1), the parameters are updated by subtracting $x_i$: $w=w-x_i$.

In FIG. 6, a variant of the general Perceptron process which be may employed by embodiments of the present invention is displayed. The variant in FIG. 6 is able to update the parameters more efficiently. In FIG. 6, the weight vectors for each node are initialized to be zero or small random variables. The parameters w and $w_0$ are combined into one vector, and each feature vector $x_{i\,id}$ augmented by adding 1 to its first column. Thus, the update of the decision function can be simplified to $f(x)=w^T x$. Each time an instance is misclassified at a node m, the associated weights are updated by adding $x_i$ with a constant factor, as shown in line 7. The algorithm stops when all instances have been classified. The present principles define $\delta=-w^T x$ and use it as the learning rate for each Perceptron update. $\epsilon$ is a very small positive number. In this manner, the Perceptron update is accelerated by reducing the error rate after each step. When all instances have been classified, the algorithm stops and outputs the learned weight vectors.

After training, each node only needs to store the weight vectors in the memory. The trained classifiers can be used for real-time problem classification when a new problem is reported. Specifically, when a new problem x● occurs, the multilabel y● is computed using the same top-down process, except for the condition that a node in is visited only if its parent node par(m) classifies the instance x● to be positive. Given a set of N training instances and M predefined labels, the online learning algorithm iterates N*M steps to update the parameters. During each update, the prediction is calculated by multiplying two d-dimensional vectors into a scalar. Thus, the computational complexity of the present principles is bounded by O(MNd).

Having described preferred embodiments of a system and method for incident management enhanced with problem classification for technical support services (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An incident management system enhanced with problem classification, comprising:
    a monitor and data collector configured to monitor an Information Technology environment, collect available data about the environment and in response to a problem, send collected problem data to at least one of a historic problem data storage device and a problem data pattern classifier;
    a storage device configured to store historic problem data labeled with a multilabel that represents which nodes are associated with a problem and a root cause of the problem associated with that data; and
    a problem data pattern classifier which classifies current problem data into a predefined hierarchical structure that includes one or more trees, each comprising a root node and one or more leaf nodes, and automatically generates the root cause of the current problem based on multilabels of the historic problem data stored in the storage device,
    wherein each node includes a linear classifier that accepts a feature vector based on the collected problem data and uses a weight vector to determine whether there is a problem at the node.

2. The incident management system of claim 1 wherein a linear classifier is trained for each node in the hierarchy.

3. The incident management system of claim 2 wherein the root cause of new problems are generated by traversing the hierarchy in a top-down fashion and utilizing the trained linear classifiers at each node.

4. The incident management system of claim 1 further comprising:
    a problem determination module in communication with a user node in an IT environment.

5. The incident management system of claim 4, wherein the problem determination module receives problem notifications and communicates problem notifications to the monitor and data collector.

6. The incident management system of claim 4, wherein the problem determination module, in response to a problem, receives problem data from the monitor and data collector, receives the automatically generated root cause of the problem from the problem data pattern classifier and presents the problem data and generated root cause to the user or technical support personnel through an input/output interface.

7. The incident management system of claim 4, wherein the problem determination module, after the problem has been solved, receives from the user the actual root cause of the problem and communicates a cause to the historic problem data storage as a label of the data associated with that problem.

8. The incident management system of claim 1, wherein the problem data pattern classifier learns problem patterns from the historic problem data and root causes stored in the storage device and generates the root cause of new problems based on the learned patterns.

9. The incident management system of claim 8, wherein the problem data pattern classifier further stores the learned patterns in memory or a storage device.

10. The incident management system of claim 9, wherein the monitor and data collector compares currently monitored data to the stored data patterns to recognize problems.

11. The incident management system of claim 10, wherein the monitor and data collector further sends a problem notification to the problem determination module if a problem is recognized.

12. The incident management system of claim 8 wherein the problem data classifier learn patterns incrementally when new historic problem data is available.

13. A method of problem determination and resolution, comprising the steps of:
    learning patterns of problem causes by classifying problem data into a predefined hierarchical structure comprising one or more nodes and a linear classifier that is trained for each node;
    collecting all available data from an Information Technology environment when a problem occurs;
    generating a root cause of the problem using the collected data and the learned problem patterns, wherein the linear classifier at each node accepts a feature vector based on the collected problem data and uses a weight vector to determine whether there is a problem at the node;
    utilizing the generated root cause and the collected data to solve the problem; and
    storing the collected data in a storage device and labeling the data with the root cause of the problem associated with that data.

14. The method of claim 13 wherein the step of learning patterns is performed incrementally when new historical problem data is available.

15. The method of claim 13 wherein the root cause is generated by traversing the hierarchy in a top-down fashion.

16. The method of claim 13 further comprising the step of presenting the generated root cause and the collected data to a user via an input/output interface, wherein the user utilizes the root cause and the collected data to solve the problem.

17. The method of claim 16 further comprising the steps of:
    receiving from a user either confirmation that the generated root cause is the actual root cause or, alternatively, a new root cause which was found to be the actual root cause; and
    the collected data stored in the storage device is labeled with the actual root cause confirmed or entered from the user.

18. The method of claim 13 wherein the step of learning problem patterns further comprises storing the learned patterns in memory or a storage device.

19. The method of claim 18 further comprising the step of determining if a problem has occurred in the Information Technology environment by collecting monitoring data from the Information Technology environment and comparing the monitored data with the stored problem patterns.

20. A non-transitory computer readable storage medium comprising a computer readable program, wherein the computer readable program when executed on a computer causes the computer to:
    learn patterns of problem causes incrementally when new historical problem data is available by classifying the problem data into a predefined hierarchical structure, wherein the hierarchical structure comprises one or more nodes and a linear classifier is trained for each node, and wherein the learned patterns are stored in memory or a storage device;
    determine if a problem has occurred in an Information Technology environment by collecting monitoring data from the Information Technology environment and comparing the monitored data with the stored problem patterns;
    collect all available data from the Information Technology environment when a problem occurs;
    generate a root cause of the problem using the collected data and the learned problem patterns by traversing the hierarchy in a top-down fashion and utilizing the trained linear classifiers at each node, wherein the linear classifier at each node accepts a feature vector based on the collected problem data and uses a weight vector to determine whether there is a problem at the node; and store the collected data in a storage device and labeling the data with the root cause of the problem associated with that data.

21. The non-transitory computer readable storage medium of claim 20 which, when executed on a computer, further causes the computer to utilize the generated root cause and the collected data to solve the problem.

22. The non-transitory computer readable storage medium of claim 20 which, when executed on a computer, further causes the computer to present the generated root cause and the collected data to a user via an input/output interface, wherein the user utilizes the root cause and the collected data to solve the problem.

23. The non-transitory computer readable storage medium of claim 22 which, when executed on a computer, further causes the computer to:

receive from a user either confirmation that the generated root cause is the actual root cause or, alternatively, a new root cause which was found to be the actual root cause; and label the collected data stored in the storage device with the actual root cause confirmed or entered from the user.

* * * * *